(Model.)

F. B. GALLOWAY.
Car Mover.

No. 235,759.  Patented Dec. 21, 1880.

WITNESSES:
C. Neveux,
B. G. Underwood.

INVENTOR:
F. B. Galloway,
BY Munn & Co.
ATTORNEYS.

United States Patent Office.

FRANK B. GALLOWAY, OF FARM RIDGE, ILLINOIS.

CAR-MOVER.

SPECIFICATION forming part of Letters Patent No. 235,759, dated December 21, 1880.

Application filed August 24, 1880. (Model.)

*To all whom it may concern:*

Be it known that I, FRANK BARCLAY GALLOWAY, of Farm Ridge, in the county of La Salle and State of Illinois, have invented a new and useful Improvement in Car-Movers, of which the following is a specification.

Figure 1:
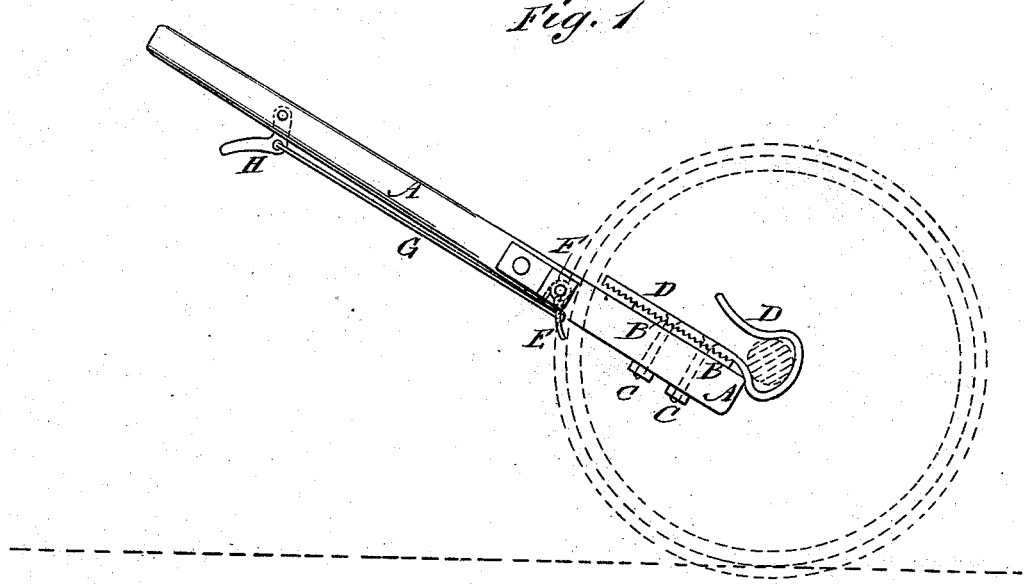
Figure 2:
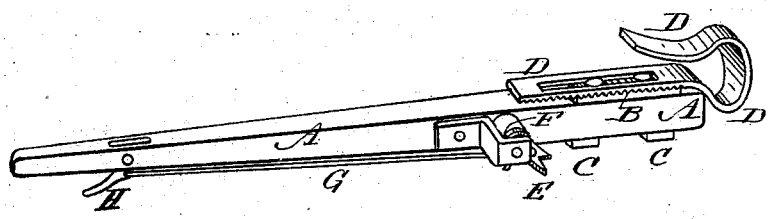

Figure 1 is a side elevation of the improvement. Fig. 2 is a perspective view.

Similar letters of reference indicate corresponding parts.

The object of this invention is to furnish implements for starting or moving railroad-cars by hand, which shall be simple in construction and conveniently applied.

The invention consists of a lever provided with a hook to engage upon the car-axle and a spring pawl to engage with the flange of the car-wheel; and also, in the combination therewith, of a serrated holding-plate and bolts for adjusting the mover to the size of the car-wheel and of a rod and bent lever for withdrawing the spring-pawl from the flange of the car-wheel, as will be hereinafter fully described.

A is a lever of convenient length, and of such a size as will give it the necessary strength. Upon the upper side of the forward end of the lever A is placed a plate, B, which has two holes formed through it to receive two bolts, C, that pass through holes in the lever A and have nuts screwed upon their lower ends. The upper side of the plate B is serrated to fit upon the serrated lower side of the shank of the hook D, which shank is slotted longitudinally to receive the bolts C, so that the hook D can be adjusted as the size of the car-wheel may require by loosening the nuts of the bolts C. The hook D is made of such a size that it can be readily passed over a car-axle.

To the side of the lever A and to a bracket attached to the said side is pivoted a pawl or dog, E, the forward end of which is notched to receive and bite upon the flange of a car-wheel. The pawl E is held forward by a spring, F, attached to it and to the bracket with which the said pawl is connected.

To the pawl E is attached the end of the rod G, which extends back along the lever A, and its other end is pivoted to a small bent lever, H. The bent lever H is pivoted to the lever A in such a position that it can be readily operated by the hand that operates the lever A to withdraw the pawl E from the flange of the car-wheel when the car-mover is to be applied to or removed from a car. With this construction, by hooking the hook D around the axle of a car in such a position that the pawl E will engage with the flange of the car-wheel and by working the lever A up and down the car-wheel will be turned, moving the car forward.

Having thus described my invention, what I claim as new, and desire to secure by Letters Patent, is—

1. A car-mover, constructed substantially as herein shown and described, consisting of the lever A, the hook D, having a slotted and serrated shank, the serrated holding-plate B, the bolts C, the spring-pawl E F, and the rod and bent lever G H, as set forth.

2. In a car-mover, the combination, with the lever A, of the hook D, to hook upon a car-axle, and the spring-pawl E F, to engage with the flange of a car-wheel, substantially as herein shown and described, whereby the car-wheel can be turned by working the lever A, as set forth.

3. In a car-mover, the combination, with the lever A and the hook D, having a slotted and serrated shank, of the serrated holding-plate B and the bolts C, substantially as herein shown and described, whereby the hook D can be adjusted to the size of the car-wheel, as set forth.

4. In a car-mover, the combination, with the lever A and the spring-pawl E F, of the rod G and the bent lever H, substantially as herein shown and described, whereby the spring-pawl E F can be withdrawn from the flange of a car-wheel, as set forth.

FRANK BARCLAY GALLOWAY.

Witnesses:
THOMAS M. KIMBALL,
W. S. H. GALLOWAY.